United States Patent
Yoshida

(10) Patent No.: US 9,169,869 B2
(45) Date of Patent: Oct. 27, 2015

(54) SIDE SEAL AND LINEAR GUIDE APPARATUS COMPRISING THE SAME

(71) Applicant: NSK Ltd., Shinagawa-ku, Tokyo (JP)

(72) Inventor: Toshio Yoshida, Saitama (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/364,552

(22) PCT Filed: Sep. 19, 2012

(86) PCT No.: PCT/JP2012/005942
§ 371 (c)(1),
(2) Date: Jun. 11, 2014

(87) PCT Pub. No.: WO2013/088614
PCT Pub. Date: Jun. 20, 2013

(65) Prior Publication Data
US 2014/0321777 A1      Oct. 30, 2014

(30) Foreign Application Priority Data

Dec. 16, 2011 (JP) ................. 2011-275751
Aug. 27, 2012 (JP) ................. 2012-187017
Aug. 27, 2012 (JP) ................. 2012-187019

(51) Int. Cl.
*F16C 33/00* (2006.01)
*F16C 29/08* (2006.01)
*F16C 29/06* (2006.01)

(52) U.S. Cl.
CPC ............. *F16C 29/086* (2013.01); *F16C 29/06* (2013.01); *F16C 29/0609* (2013.01)

(58) Field of Classification Search
CPC .. F16C 29/06; F16C 29/0609; F16C 29/0602; F16C 29/0633; F16C 29/0635; F16C 29/0638; F16C 29/0642; F16C 29/0645; F16C 29/086; F16C 29/088
USPC ............................................ 384/15; 277/569
See application file for complete search history.

(56) References Cited

U.S. PATENT DOCUMENTS 6,030,124 A * 2/2000 Moseberg et al. ............... 384/15
2002/0113376 A1 8/2002 Yabe et al.
(Continued)

FOREIGN PATENT DOCUMENTS

JP        5-296352 A     11/1993
JP     2002-181201 A      6/2002
(Continued)

OTHER PUBLICATIONS

Japanese Office Action dated Jan. 6, 2015 with English translation (11 pages).
(Continued)

*Primary Examiner* — James Pilkington
(74) *Attorney, Agent, or Firm* — Crowell & Moring LLP

(57) ABSTRACT

To provide a side seal capable of preventing the entrance of the foreign matter to the inside of the slider and the outflow of the lubricant without damaging or reducing the original function of the lip, and to provide a linear guide apparatus including the above described side seal. A linear guide apparatus (1) includes a side seal (30) attached to an end of the slider (20) in the axial direction and including a lip portion (33) coming into sliding contact with the guide rail (10). The side seal (30) includes a thin film (40) coming into sliding contact with the guide rail (10) and filling a part of a gap (34) of the lip portion (33).

6 Claims, 6 Drawing Sheets

(56) References Cited

U.S. PATENT DOCUMENTS

2008/0089622 A1* 4/2008 Haub .................... 384/15
2010/0329595 A1 12/2010 Kuwabara et al.

FOREIGN PATENT DOCUMENTS

| | | |
|---|---|---|
| JP | 2006-275208 A | 10/2006 |
| JP | 2008-151325 A | 7/2008 |
| JP | 2011-12715 A | 1/2011 |

OTHER PUBLICATIONS

International Preliminary Report on Patentability (PCT/IB/338) and (PCT/IB/373) dated Jun. 26, 2014, including Written Opinion (PCT/ISA/237) (six (6) pages).
Japanese language Written Opinion (PCT/ISA/237) dated Oct. 23, 2012 (Three (3) pages).
International Search Report (PCT/ISA/210) dated Oct. 23, 2012, with English translation (Three (3) pages).
Taiwanese Office Action dated Sep. 29, 2014 with English translation (eight pages).

* cited by examiner

Prior Art

Prior Art

SIDE SEAL AND LINEAR GUIDE APPARATUS COMPRISING THE SAME

BACKGROUND

The present invention relates to a side seal and a linear guide apparatus including the same.

Conventionally, a linear guide apparatus (linear guide) is provided with side seals at the both ends of a slider in the movement direction so that a foreign matter does not enter the inside of the slider. Such a side seal includes a metal plate referred to as a cored bar, which is attached and fixed to the slider with screws and a body portion fixed to the metal plate by adhesion, the body portion including a lip portion coming into sliding contact with a guide rail. Then, the side seal having such a configuration is disposed so as to fill the gap between the guide rail and an end cap attached to each of the both ends of the slider.

Therefore, the above-described lip portion prevents the foreign matter on the top face or the side face of the guide rail from entering the inside of the slider when the slider relatively moves with respect to the guide rail.

Moreover, as illustrated in FIG. 5, in conventional side seals, there are often provided with "gaps 134" between a lip portion 133 and a guide rail 110, the gaps 134 being located at positions other than a necessary contact portion, so as to prevent the contact portion between the lip portion 133 and the guide rail 110 from being a surface increasing the sliding friction. Similarly, a "relief portion 135" is often provided at the circumference of the lip portion 133 so as to provide the lip portion 133 with freedom in deformation in order to avoid a strong contact with the guide rail 110 and so as not to increase the sliding friction.

In this situation, an under seal can be disposed on the bottom face of the slider corresponding to an opening side of the slider having a letter U shape, so as to fill the gap between the slider and the guide rail and prevent the entrance of the foreign matter from the guide rail.

However, the side seal has a substantially letter U shape almost the same as the shape of the end cap in a plane perpendicular to the moving direction (axial direction) of the slider. An end portion of the lip portion disposed along the outer circumference of the guide rail is positioned at the opening side of the slider. Therefore, there is a possibility of the entrance of the foreign matter or the outflow of the lubricant, since the "relief portion" and the "gap" communicate with the inside of the slider.

Therefore, as a solution, PTL 1 disclose a technique in which an auxiliary lip portion 114 is formed on side seal S facing an inner seal 104 and the under seal 105, the auxiliary lip portion 114 filling the gap formed between the end portion of the inner seal 104 or the under seal 105 and the slope of the side seal S.

SUMMARY

However, in the linear guide apparatus described in PTL 1, when the auxiliary lip portion is formed, the contact area between the lip portion and the guide rail extends, and the sliding friction of the side seal is increased. Thus, the auxiliary lip portion may be a cause of the increase in the sliding friction of the linear guide apparatus.

Additionally, in the linear guide apparatus described in PTL 1, the auxiliary lip portion is pressed back by a force F1 unnecessarily from the guide rail, when the auxiliary lip portion comes into contact with the guide rail, as illustrated in FIG. 7. As a result, the lip portion adjacent to the auxiliary lip portion is lifted up (like being pulled up) by a force F2 together with the auxiliary lip portion pressed back, thus the gap is enlarged. Therefore, there is a problem that the foreign matter enters the inside of the slider more easily.

Then, the present invention has been made in view of the above-described problems, and it is an object of the present invention to provide a side seal capable of preventing the entrance of the foreign matter to the inside of the slider and the outflow of the lubricant without damaging or deteriorating the original function of the lip, and to provide a linear guide apparatus including the above described side seal.

In order to solve the aforementioned problem, according to an aspect of the present invention, there is provided a side seal of a linear guide apparatus, the linear guide apparatus including a guide rail including a rolling element rolling groove extending in an axial direction and a slider straddling on the guide rail, the side seal being configured to be attached to an end of the slider in the axial direction, the side seal having a letter U shape and including: a lip portion protruding from an inner circumferential surface of the side seal so as to come into sliding contact with the guide rail; and a thin film coming into sliding contact with the guide rail to fill a part of a gap formed by the lip portion, wherein an end face of the side seal facing in an opening direction of the side seal is flush with an end face of the thin film.

Additionally, according to another aspect of the present invention, there is provided a linear guide apparatus including: a guide rail including a rolling element rolling groove extending in an axial direction; a slider including a rolling element rolling groove facing the rolling element rolling groove of the guide rail and straddling on the guide rail to be capable of moving relatively in the axial direction through rolling of a plurality of rolling elements interposed between the rolling element rolling grooves; a side seal attached to an end of the slider in the axial direction and including a lip portion coming into sliding contact with the guide rail; and a thin film coming into sliding contact with the guide rail to fill a part of a gap formed by the lip portion, wherein an end face of the side seal facing in an opening direction of the side seal is flush with an end face of the thin film.

Additionally, the side seal may include a relief portion, and a thin film filling a part of the relief portion, wherein an end face of the thin film is flush with the end face of the side seal.

Additionally, a material of the thin film may be the same as a material of the lip portion.

According to the present invention, it is possible to provide a side seal capable of preventing the entrance of the foreign matter to the inside of the slider and the outflow of the lubricant without damaging or reducing the original function of the lip, and to provide a linear guide apparatus including the above described side seal.

DETAILED DESCRIPTION

Hereinafter, embodiments of a side seal and a linear guide apparatus including the side seal according to the present invention will be described with reference to the drawings.

Figure 1:
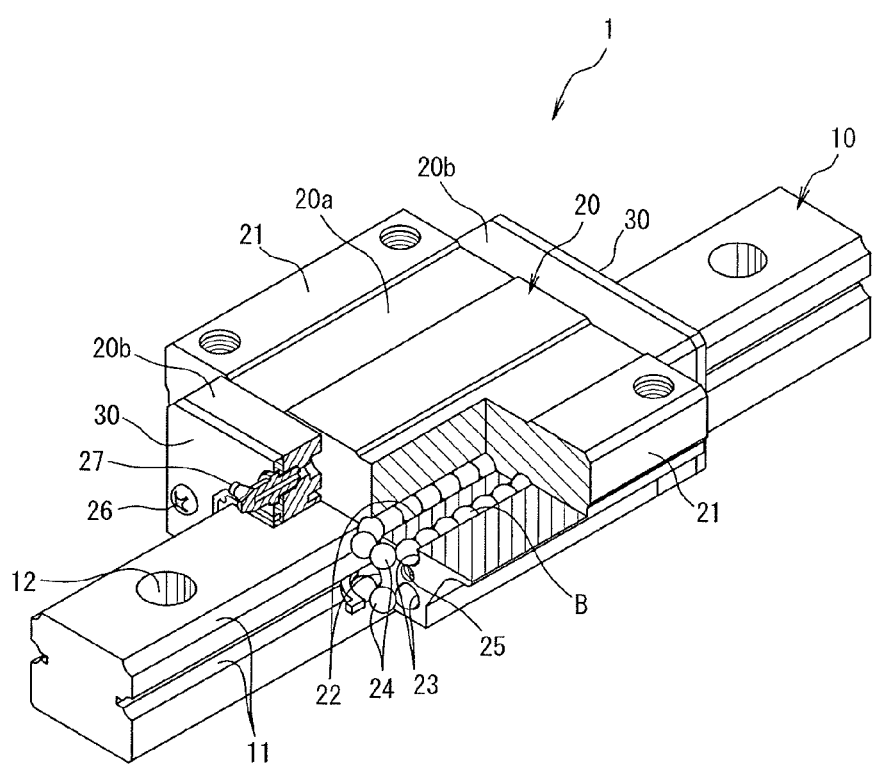
FIG. 1 is a perspective view illustrating a configuration of a linear guide apparatus according to one embodiment of the present invention.
Figure 2A:
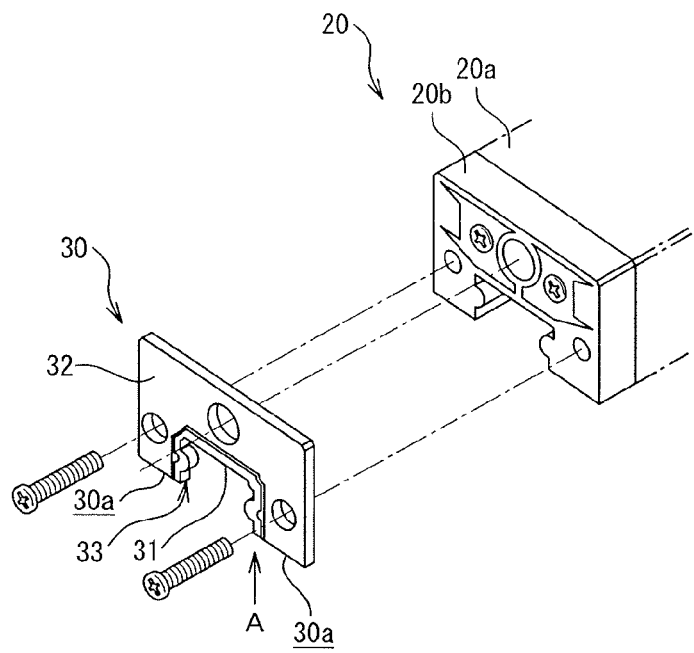
FIG. 2A is an exploded perspective view illustrating a configuration of a linear guide apparatus according to one embodiment of the present invention when viewed from a side seal to an end cap side.
Figure 2B:
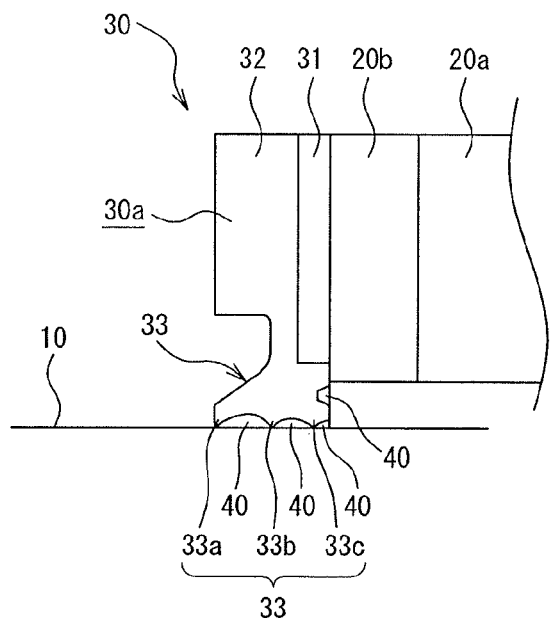
FIG. 2B is a view in the direction of arrow A in FIG. 2A.
Figure 3:
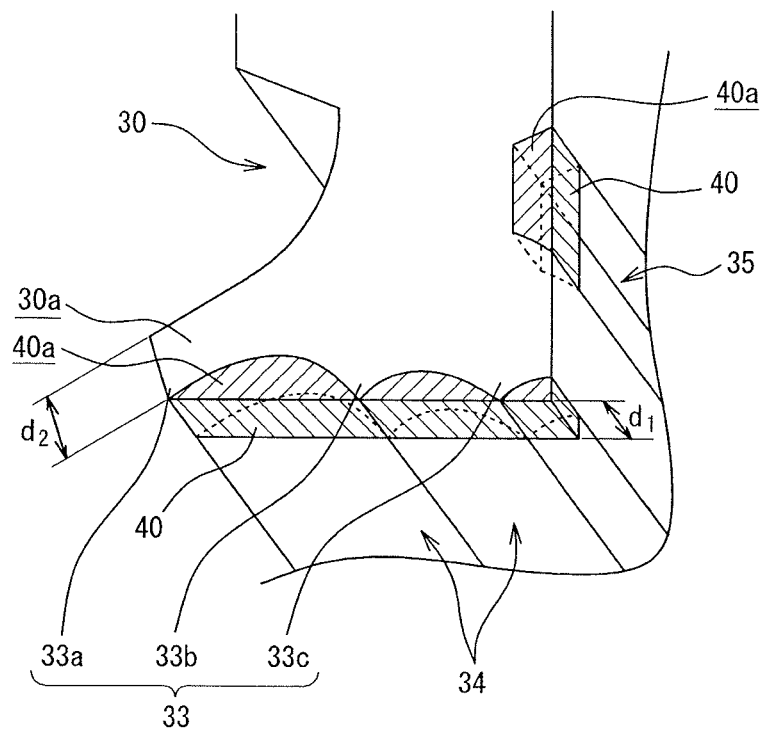
FIG. 3 is a perspective view illustrating a configuration of a side seal according to one embodiment of the present invention, when viewed from an opening side of the side seal.

FIG. 1 is a perspective view illustrating a configuration of a linear guide apparatus according to one embodiment of the present invention. Additionally, FIG. 2A is an exploded perspective view illustrating a configuration of a linear guide apparatus according to one embodiment of the present invention when viewed from a side seal to an end cap side. FIG. 2B is a view in the direction of arrow A in FIG. 2A. Additionally, FIG. 3 is a perspective view illustrating a configuration of a side seal according to one embodiment of the present invention, when viewed from an opening side of the side seal.

As illustrated in FIG. 1 and FIG. 2, a linear guide apparatus 1 includes a guide rail 10 extending in an axial direction and a slider 20 straddling on the guide rail 10 to be capable of moving relatively in the axial direction.

Rolling element rolling grooves 11 extending in the axial direction are formed on the both side faces of the guide rail 10, respectively. Rolling element rolling grooves 22 facing the rolling element rolling grooves 11, respectively, are formed on inside surfaces of both arm portions 21 of the slider body 20a of the slider 20, respectively. Further, between these rolling element rolling grooves 11 and 22 facing each other, as one example of the rolling elements, plural balls B are rollably loaded. Through rolling of these balls B, the slider 20 can move relatively over the guide rail 10 in the axial direction.

Along with this movement, the balls B interposed between the guide rail 10 and slider 20 roll and move to the end portion of the slider 20. However, in order for the slider 20 to continuously move in the axial direction, these balls B have to be circulated endlessly.

For this reason, rolling element passages 23 penetrating in the axial direction are formed in the arm portions 21 of the slider body 20a, and substantially lateral U-shaped end caps 20b are fastened to the both ends of the slider body 20a, respectively, by screws 26 or other fastening means, for example. Direction changing channels 24 are formed in the end caps 20b, respectively, the direction changing channels 24 curving in a semi-arcuate shape and communicating the both rolling element rolling grooves 11 and 22 with the rolling element passages 23, so as to form endless rolling element circulation raceways.

Additionally, side seals 30 are attached to the both ends of the slider 20 in the axial direction, respectively. It is noted that a lubricant supply member, not illustrated, coming into sliding contact with the rolling element rolling groove 11 and supplying a lubricant may be provided between the slider 20 (that is, end cap 20b) and the side seal 30 as necessary. Note that, in FIG. 1, reference numeral 25 indicates a tap hole for a screw 26 formed on the end face of the slider body 20a in the axial direction, reference numeral 27 indicates a greasing nipple, and reference numeral 12 indicates a bolt hole for fastening the guide rail 10.

The side seal 30 is formed to have a substantially lateral U-shape in the same way as the end cap 20b, their inside circumference is made to be a seal surface coming into sliding contact with the guide rail 10. The side seal 30 includes a body portion 32 integrally formed by baking and bonding a synthetic rubber to a cored bar 31 which is formed by press working. The cored bar 31 is made of a steel sheet, for example. Then, a lip portion 33 is formed on the guide rail 10 side of the body portion 32, the lip portion 33 coming into sliding contact with the guide rail 10 and filling the gap between the guide rail 30 and the end cap 20b. The lip portion 33 includes plural lip pieces 33a to 33c arranged in the axial direction. Additionally, the contours of the outer circumferential surfaces of the lip pieces 33a to 33c are formed to be slightly smaller than the outer circumferential shape of the guide rail 10. Furthermore, the lip pieces 33a to 33c are formed in different shapes from one another so that the lip pieces 33a to 33c come into contact with the guide rail 10 at different contact pressures, respectively.

Additionally, as illustrated in FIG. 2B, with regard to the lip portion 33, gaps 34 are provided between the lip pieces 33a to 33c and the guide rail 10, the gaps 34 being located at portions other than a necessary contact portion, so as to prevent the contact portion between the lip portion 33 and the guide rail 10 from being a surface increasing the sliding friction. Furthermore, a relief portion 35 is provided at the lip portion 33 so as to provide the lip pieces 33a to 33c with freedom in deformation in order to avoid strong contacts with the guide rail 10 and so as not to increase the sliding friction.

The side seal 30 having such a configuration prevents with the lip portion 33 that the foreign matter on the top face or the side face of the guide rail 10 enters the inside of the slider 20 when the slider 20 relatively moves with respect to the guide rail 10.

Furthermore, in the side seal and the linear guide apparatus according the present embodiment, a thin film 40 is provided in a part of the gap 34 of the lip portion 33, one face of the thin film 40 being flush with a end face 30a of the side seal 30 (see FIG. 3).

As illustrated in FIG. 3, the thin film 40 is provided to come into sliding contact with the guide rail 10 and to fill a part of the gap 34 formed by the lip pieces 33a to 33c so that the thin film 40 does not restrict the freedom of the lip portion 33. Furthermore, the end face 40a of the thin film 40 (see FIG. 3) is provided to be flush with the end face 30a of the side seal 30. In this situation, "the end face of the side seal 30" is a face on the tip of each of two protruding portions, the face facing in an opening direction of the lateral U-shaped side seal 30 opens. The thin film 40 is provided to extend from the end face 30a of the side seal 30 and to have a predetermined thickness $d_1$ (see FIG. 3), and does not fill the entirety of the gap 34 formed by the lip pieces 33a to 33c. That is, by providing thin films 40 in the side seal 30 so that each of thin films 40 is flush with each of two end faces 30a of the lateral U-shaped side seal 30, the gap 34 becomes a closed space having a U-shaped cross section with the lip pieces 33a to 33c, the guide rail 10 and the thin films 40. In this situation, the thickness of the thin film 40 is smaller the thickness $d_2$ of the tip portion of the lip portion 33 where the thickness of the lip piece 33a is the minimum. Therefore, the thin film 40 can deform more easily than the lip piece 33a, and as a result, the thin film 40 only slightly affects the contact between the lip portion 33 and the guide rail 10. The increase of the sliding friction and the lift up of the lip portion 33 are limited to a quite small level. It is noted that the thin film 40 is intentionally indicated by hatching in FIG. 3.

Herein, it is preferred that the thin film 40 be made of the same material as that of the lip portion 33. By employing a thin-film shape, there is only a small influence on the contact between the lip portion 33 and the guide rail 10, and the increase of the sliding friction and the lift up of the lip portion 33 are reduced.

Additionally, when the thin film 40 is made of the same material as that of the lip portion 33 of the side seal 30, the lip portion 33 and the thin film 40 can be formed concurrently. Therefore, it is possible to improve the function of the seal without adding a process. It is noted that the material suitable for the seal is preferable as the material for the thin film 40. The material for the thin film 40 may be, for example, nitrile-butadiene rubber (NBR), hydrogenated nitrile rubber (H-NBR), acrylic rubber (ACM), silicone rubber (VMQ), fluorine-contained rubber (FKM), polytetrafluoroethylene (PTFE), thermoplastic elastomer or the like.

By providing with such a thin film 40, the gap at the end face 30a of the side seal 30 is eliminated, it is possible to prevent the entrance of the foreign matter to the inside of the slider 20 or the outflow of the lubricant.

Additionally, even when the side seal 30 is provided with the thin film 40, the lift up of the lip portion 33 caused by the contact between the thin film 40 and the guide rail 10 may be alleviated.

As described above, the linear guide apparatus according to the present embodiment and the linear guide unit described in PTL 1 are in common in that their configurations have a side seal with a shape in which a gap can be filled to prevent the entrance of a foreign matter. However, in the linear guide unit described in PTL 1, the auxiliary lip portion filling the gap formed by a step between the end portion of the under seal or the inner seal and the slope of the lip portion of the side seal damages or degrades the original function of the lip portion. In the linear guide apparatus according to the present embodiment, by providing the thin film in a part of the gap of the side seal, it is possible to prevent the entrance of the foreign matter to the inside of the slider 20 and the outflow of the lubricant, without damaging or degrading the original function of the lip portion.

It is noted that the thin film 40 may be provided at the relief portion 35 formed at the side seal 30 (see FIG. 3). In this situation, the thin film 40 is provided to fill a part of the gap formed by the relief portion 35 of the side seal 30, and the respective end faces 40a are flush with the respective end faces 30a of the side seal 30 (only one of the respective end faces 30a is illustrated in the figure).

In this way, by providing the thin film 40 at the relief portion 35 of the side seal 30, the side seal has advantageous effects capable of preventing the entrance of the foreign matter to the inside of the slider 20 and the outflow of the lubricant, without damaging or degrading the original function of the relief portion 35.

In the linear guide rail 1 according to the present embodiment having such a configuration, the thin film 40 fills the gap 34 which has been formed at the lip portion 33 in the conventional side seal 30, the thin film 40 coming into sliding contact with the guide rail 10 and being provided so that the respective end faces 40a are flush with the respective end faces 30a of the side seal 30 (only one of the respective end faces 30a is illustrated in the figure). Additionally, in the linear guide rail 1 according to the present embodiment, it is preferred that the thin film 40 also fill the relief portion 35 that has been formed at the lip portion 33 in the conventional side seal 30, the thin film 40 coming into sliding contact with the guide rail 10 and being provided so that the respective end faces 40a are flush with the respective end faces 30a of the side seal 30 (only one of the respective end faces 30a is illustrated in the figure).

As a result, it is possible to provide the side seal 30 capable of preventing the entrance of the foreign matter to the inside of the slider 20 and the outflow of the lubricant without damaging or degrading the original function of the lip portion 33, and to provide a linear guide apparatus 1 including the side seal 30.

Figure 4A:
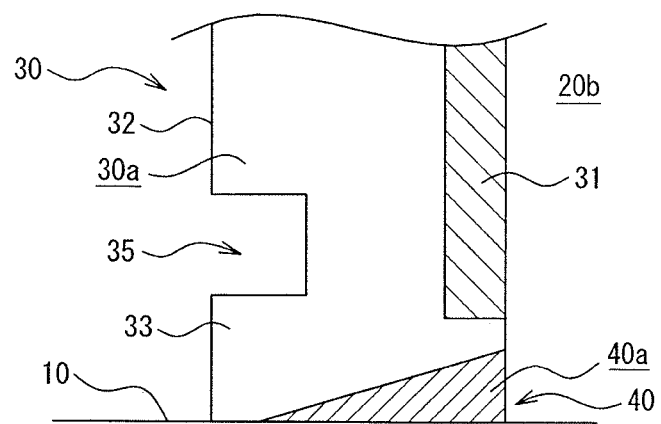
FIG. 4A is a sectional view illustrating a configuration of a side seal according to another embodiment of the present invention taken along an axial direction.
Figure 4B:
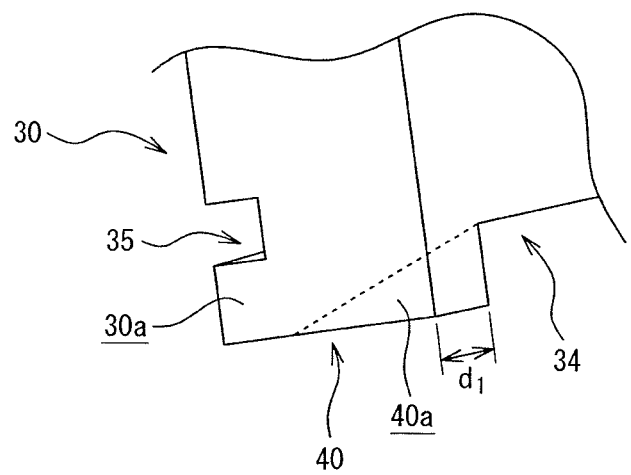
FIG. 4B is a perspective view illustrating the configuration of the side seal according to the another embodiment of the present invention, when viewed from a plane facing an end cap of the side seal.
Figure 5:
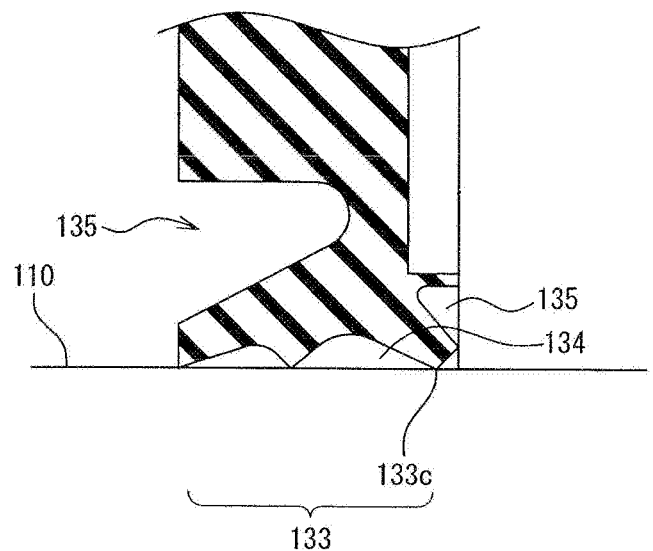
FIG. 5 is a sectional view illustrating a configuration of a prior art side seal taken along an axial direction.
Figure 6:
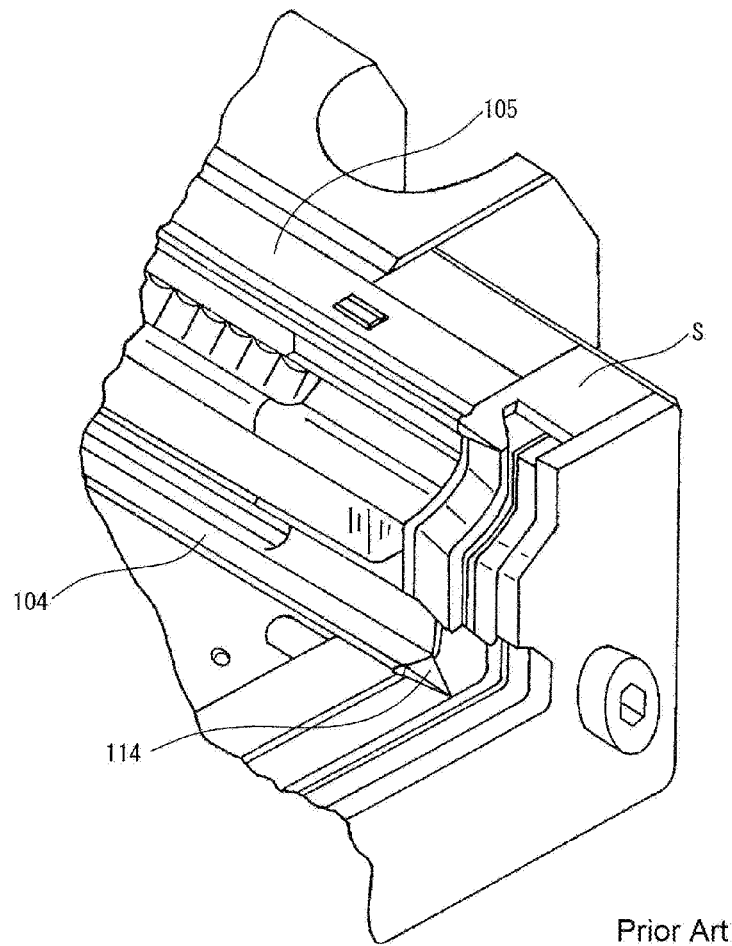
FIG. 6 is a perspective view illustrating a configuration of a prior art linear guide apparatus, when viewed from an opening of a side seal.
Figure 7:
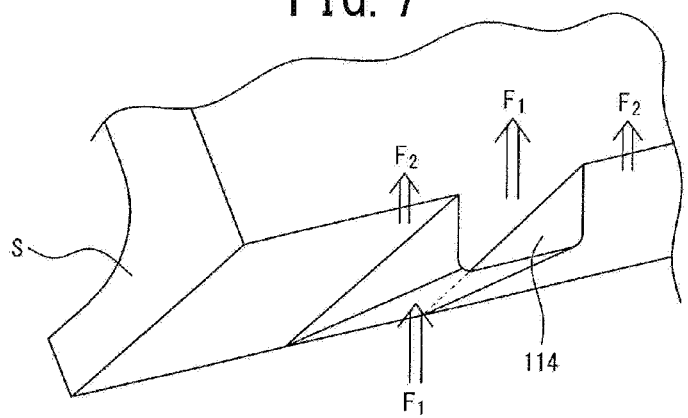
FIG. 7 is a perspective view illustrating a defect of an auxiliary lip in a prior art linear guide apparatus, when viewed from an end face side of a side seal.

Hereinafter, a side seal according to another embodiment of the present invention will be described with reference to the drawings. Since the side seal according to the present embodiment is different from the above-described embodiment only in the shape of the lip, the description of similar configurations having similar reference signs to those of the above-described embodiment are omitted. FIGS. 4A an 4B are sectional views taken along the axial direction and a perspective view, respectively, each of these views illustrating a configuration of a side seal according to another embodiment of the present invention. It is noted that FIG. 4B is a perspective view, when viewed from a plane facing the end cap 20b (see FIGS. 1 and 2) of the side seal 30. It is noted that the thin film 40 is intentionally indicated by hatching in FIG. 4A.

As illustrated in FIGS. 4A and 4B, for the side seal 30 according to an embodiment in which the lip portion 33 is inclined relative to the guide rail 10, the thin film 40 filling a part of the gap formed by the side seal 30 is provided so that the respective end faces 40a of the thin film 40 are flush with the respective end faces 30a of the side seal 30 (only one of the respective end faces 30a is illustrated in the figure). The thin film 40 is provided to extend from the end face 30a of the side seal 30 and to have a predetermined thickness $d_1$ (see FIG. 3), and does not fill the entirety of the gap 34. The gap 34 is interposed between the thin films 40.

This embodiment has the same advantageous effects as those of the above-described embodiment.

It is to be noted that the linear guide apparatus according to the present invention is not limited to the above-described embodiments. Various modifications may occur without departing from the scope of the present invention.

The invention claimed is:

1. A side seal of a linear guide apparatus, the linear guide apparatus including a guide rail including a rolling element rolling groove extending in an axial direction and a slider straddling on the guide rail, the side seal being configured to be attached to an end of the slider in the axial direction, the side seal having a letter U shape and comprising:
   a lip portion protruding from an inner circumferential surface of the side seal so as to come into sliding contact with the guide rail;
   a first film coming into sliding contact with the guide rail to fill a part of a cut out formed in the lip portion,
   a relief portion; and
   a second film that fills a part of the relief portion, wherein
       an end face of the side seal facing in an opening direction of the side seal is flush with an end face of the first film,
       an end face of the second film is flush with the end face of the side seal, and
       the first film has a thickness smaller than a thickness of a tip of the lip portion, the tip of the lip portion being a smallest thickness in the lip portion.

2. The side seal according to claim 1, wherein a material of the first film is the same as a material of the lip portion.

3. The side seal according to claim 1, wherein a material of the second film is the same as a material of the lip portion.

4. A linear guide apparatus comprising:
a guide rail including a first rolling element rolling groove extending in an axial direction;
a slider including a second rolling element rolling groove facing the first rolling element rolling groove of the guide rail and straddling on the guide rail to be capable of moving relatively in the axial direction through rolling of a plurality of rolling elements interposed between the first rolling element rolling groove and the second rolling element rolling groove;
a side seal attached to an end of the slider in the axial direction and including a lip portion coming into sliding contact with the guide rail; and
a first film coming into sliding contact with the guide rail to fill a part of a cut out formed in the lip portion, wherein
an end face of the side seal facing in an opening direction of the side seal is flush with an end face of the first film,
the side seal comprises a relief portion and a second film that fills a part of the relief portion,
an end face of the second film is flush with the end face of the side seal, and
the first film has a thickness smaller than a thickness of a tip of the lip portion, the tip of the lip portion being a smallest thickness in the lip portion.

5. The linear guide apparatus according to claim 4, wherein a material of the first film is the same as a material of the lip portion.

6. The linear guide apparatus according to claim 4, wherein a material of the second film is the same as a material of the lip portion.

* * * * *